United States Patent [19]

Barton

[11] Patent Number: 4,515,324
[45] Date of Patent: May 7, 1985

[54] BATTERY POWERED FISHING REEL

[76] Inventor: Felix R. Barton, 123 E. 11th, Pawhuska, Okla. 74056

[21] Appl. No.: 507,348

[22] Filed: Jun. 24, 1983

[51] Int. Cl.³ .................... A01K 89/017; A01K 87/06
[52] U.S. Cl. ................................. 242/84.1 A; 43/21; 242/215
[58] Field of Search ............... 242/84.1 A, 215; 43/21

[56] References Cited

U.S. PATENT DOCUMENTS

| | | | |
|---|---|---|---|
| 2,190,398 | 2/1940 | Bugatti | 242/215 |
| 2,743,067 | 4/1956 | Stratton | 242/84.1 A |
| 3,049,829 | 8/1962 | Clapp | 43/6.5 |
| 3,215,359 | 11/1965 | Sanders | 242/84.1 A |
| 3,252,239 | 5/1966 | Moeller | 242/84.1 A |
| 3,932,954 | 1/1976 | Wyroski | 242/84.1 A X |
| 4,283,025 | 8/1981 | Whisenhunt | 242/84.1 A |

Primary Examiner—Stuart S. Levy
Assistant Examiner—Katherine Jaekel
Attorney, Agent, or Firm—Head, Johnson & Stevenson

[57] ABSTRACT

A portable hand held type fishing reel having a motor operably connected with the spool member of the reel for facilitating winding of the fishing line onto the spool without interference with the normal operation of the fishing reel, the motor being operably connected with a switch by a battery pack which may be remotely disposed with respect to the reel, a drive assembly connected with the spool member and selectively operable upon energization of the motor for winding of the line onto the spool, the drive assembly including a pivotal lever having a normal position wherein the drive connection between the motor and spool is disengaged and selectively movable to provide an engaged position between the motor and spool, the lever being particularly designed whereby the driving engagement between the motor and spool is achieved prior to energization of the motor to substantially preclude accidental damage of the engaged driving elements.

6 Claims, 6 Drawing Figures

# BATTERY POWERED FISHING REEL

BACKGROUND OF THE INVENTION

1. Field of the Invention

This invention relates to improvements in fishing reels and more particularly, but not by way of limitation, to a battery powered fishing reel for facilitating winding of a line onto the reel.

2. Description of the Prior Art

The fishing sport is increasing in popularity today, and the use of hand held fishing rods having a fishing reel secured thereto is widespread. The usual fishing reel includes a spool upon which the fishing line is wound, the spool normally being free wheeling or freely rotatable in one direction and provided with means for manually rotating the spool in an opposite direction. As the line is cast from the reel, the rod is normally manipulated for swinging the outer end or tip thereof through an arc whereby the line pays out from the spool in order to position the baited fish hook at the desired location in the water for attracting a fish. During a fishing operation, the line is normally repeatedly cast and subsequently reeled in or rewound onto the spool in order to perform the next casting operation. The repeated casting and rewinding of the line may continue throughout a relatively long time period, and the repeated manual rewinding of the line onto the spool is not only tiresome, but is also time consuming. This is an obvious disadvantage, in addition to which the winding of the line is difficult for some persons, such as handicapped persons, and reduces the enjoyment of the sport.

Powered fishing reels are well known in the large fishing reels, such as those used for commercial fishing or deep sea fishing, such as those shown in the Stratton U.S. Pat. No. 2,743,067, issued Apr. 24, 1956 and entitled "Reel for Deep-Sea Fishing;" and the Clapp U.S. Pat. No. 3,049,829, issued Aug. 21, 1962, and entitled "Power Driven Fishing Tackle." These reels are utilized under entirely different circumstances than the usual relatively small hand held type reel, however, and the power driven spools of these large reels are normally required to facilitate the manipulation of large, heavy fish, or the like. Relatively little has been accomplished in connection with the application of power activation for the spools of the hand held type reels. One solution to the problem is shown in the Wyroski U.S. Pat. No. 3,932,954, issued Jan. 20, 1976 and entitled "Motorized Spinning Reel." This patent is directed to a battery having the drive shaft thereof operably connected with a gear train which drives the spool to facilitate the winding of the wind onto the spool. The motor is flexibly mounted in order that the drive gear secured to the drive shaft of the motor may be angularly orientated with respect to the driven gear in order to preclude damage to the gear teeth in the event of any binding action, or the like, during the winding operation. Such an arrangement is not a practical solution to the problem, however, since the distance through which the drive gear must be moved for assuring a disengagement thereof with the driven gear creates an impractical mounting arrangement for the motor. Another solution to the problem is found in my co-pending application Ser. No. 284,693, filed July 20, 1981, and entitled "Fishing Reel." In the embodiment shown in my prior patent, the handle of the fishing reel is hollow and battery means for activation of the motor for powering the reel are mounted within the hollow handle. In addition, an on-off switch means is mounted on the handle for selective application of power to the motor. This has a disadvantage in that the fishing rod itself must be altered in order to utilize the fishing reel disclosed in the prior application.

SUMMARY OF THE INVENTION

The present invention contemplates a novel, portable, hand-held type fishing reel which has been particularly designed and constructed for overcoming the foregoing disadvantages. The novel fishing reel comprises the usual spool means for receiving the fishing line thereon, and suitable manual means operably connected with the spool means for facilitating the winding of the fishing line thereon. In addition, it is frequently desirable to include a level wind means cooperating with the spool means for facilitating both the winding and unwinding of the line from the spool. A small motor is mounted at substantially any convenient location either on the fishing reel itself, or on the fishing rod in a position substantially adjacent the fishing reel and is operably connected with a switch means preferably mounted within the casing or housing of the reel. A suitable battery pack, such as a remotely disposed battery pack which may be carried in the pocket, or the like, of the user of the novel fishing reel, is connected between the motor and the switch means for selective actuation of the motor upon activation of the switch means. A lever member is pivotally secured within the housing or casing of the fishing reel and may be manually moved into and out of engagement with the switch means to control the activation of the motor. The drive shaft of the motor is operably connected with a drive gear through a suitable belt and pulley drive means, or by a suitable gear train, or the like, as desired, for transmitting rotation to the drive gear. The drive gear is carried by the pivotal lever member and may be moved into and out of engagement with a driven gear by the pivotal action of the lever. The driven gear transmits rotation in one direction to the spool means for winding of the fishing line onto the spool. The position of the drive gear on the pivotal lever is particularly selected whereby the drive gear is moved into a meshing engagement with the driven gear prior to engagement of the pivotal lever with the switch means. This assures that the mating gears will be in an operative relative position therebetween prior to the energization of the motor, thus substantially precluding accidental breakage or damage of the gear teeth. The novel portable, hand held fishing reel is simple and efficient in operation and economical and durable in construction.

DETAILED DESCRIPTION OF THE PREFERRED EMBODIMENT

Figure 1:
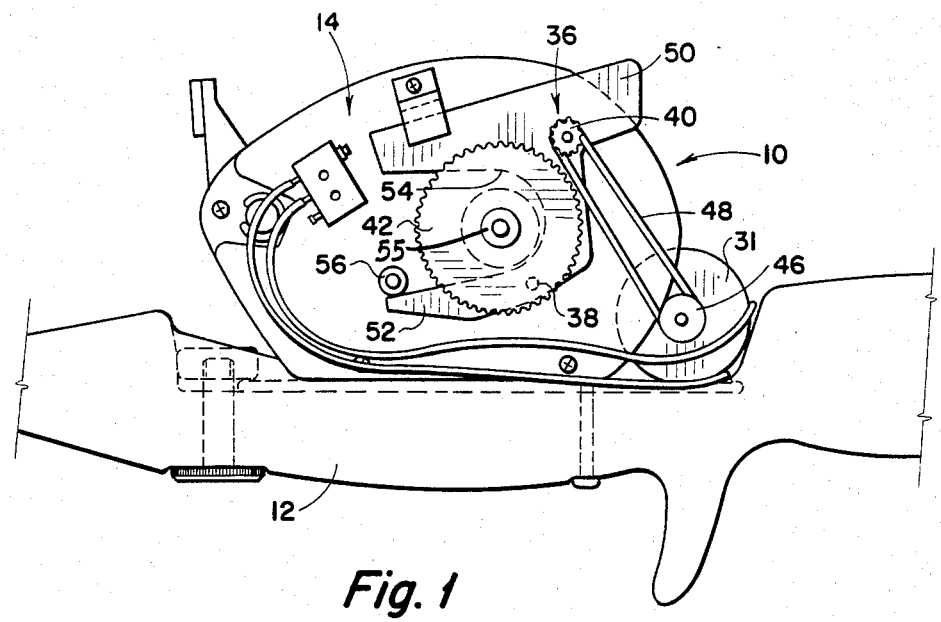
FIG. 1 is a side elevational view of a portion of a fishing rod handle having a fishing reel embodying the invention installed thereon, with a portion of the fishing reel casing being omitted for purposes of illustration, and showing the fishing reel with the spool drive means in a disengaged position.
Figure 2:
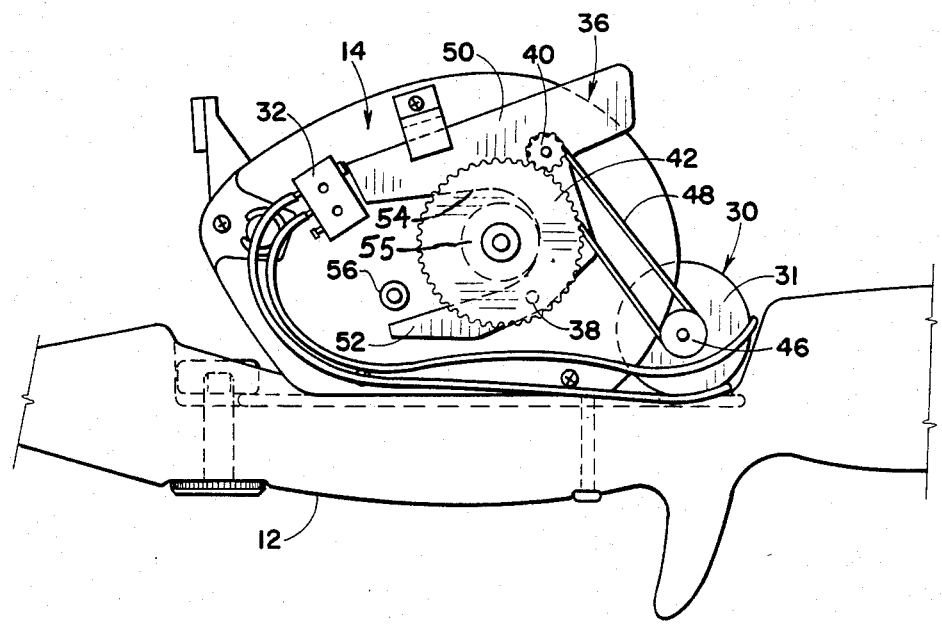
FIG. 2 is a view similar to FIG. 1 illustrating the spool drive means in an engaged position for rotation of the spool means.
Figure 3:
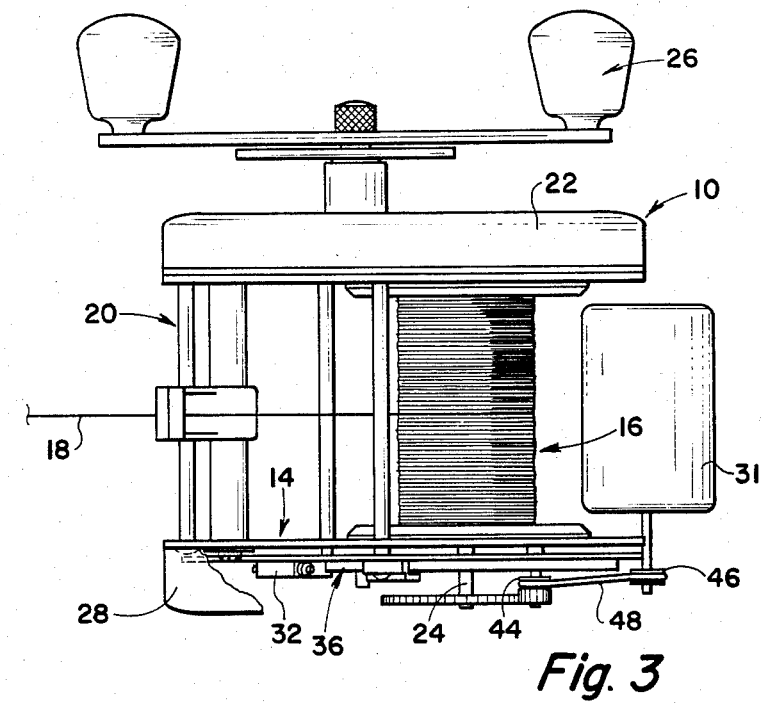
FIG. 3 is a plan view of a fishing reel embodying the invention, with a portion thereof cut away for purposes of illustration.
Figure 6:
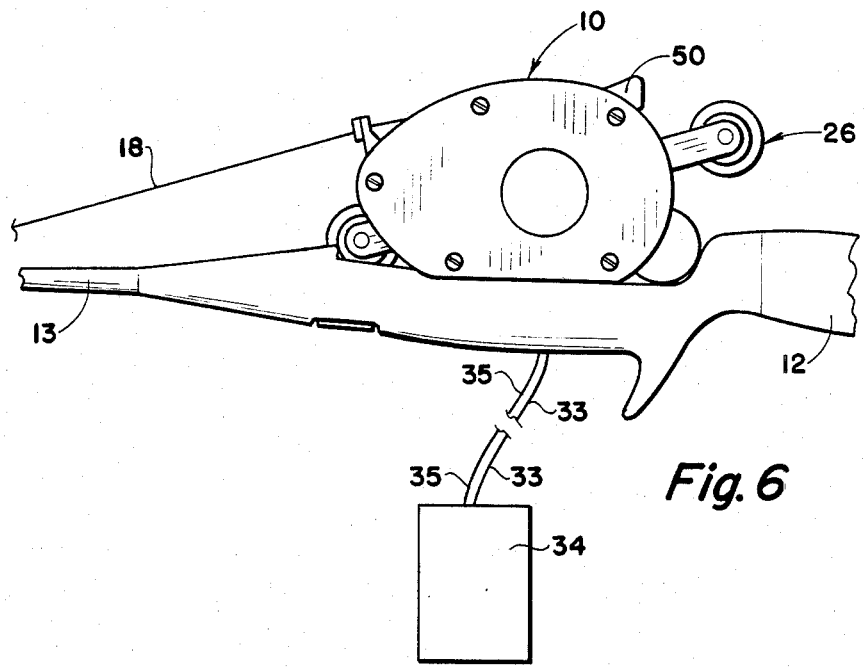
FIG. 6 is a side elevational view of a portion of a fishing rod having a fishing reel embodying the invention installed thereon, and illustrating the use of a remote battery pack means therewith.

Referring to the drawings in detail, and particularly FIGS. 1, 2 and 3, reference character 10 generally indicates a fishing reel of a portable, hand held type, adapted for installation on a suitable handle 12 of a typical fishing rod 13 (FIG. 6). The typical fishing reel 13 normally comprises a frame means 14 on which the mechanisms of the reel 10 are mounted, including a spool means 16 having a line 18 wound thereon. In many instances a level wind assembly 20 is also mounted on the frame 14 in spaced relation with respect to the spool means 16 for facilitating the even or level winding and unwinding of the line 18 with respect to the spool means 16, as is well known. It is the usual practice in many fishing reels to include a first end case, closure or housing means 22 removably secured to one outboard face of the frame means 14 for encasing a portion of the operative elements of the reel 10, such as a forward winding mechanism or gear train (not shown) interconnecting the axle or shaft 24 of the spool means 16 with a suitable manually operable rotatable handle means 26. In addition, it is normally desirable to include a release latching means (not shown) between the handle means 26 and the shaft 24 to permit free wheeling of the shaft spool means 16 in one direction without interference of the controlled rotation of the spool means 16 in the opposite direction, as will be hereinafter set forth. A second end cap, closure or housing means 28 is usually provided at the oppositely disposed outboard face of the frame means 14 for encasing additional operation mechanisms of the reel 10, such as connecting means (not shown) operably connected between the shaft 24 or spool 16 and the level wind assembly 20.

A spool drive means generally indicated at 30 is provided for selectively rotating the spool means 24 in in one direction for facilitating winding of the line 18 onto the spool means 24. The assembly 30 comprises a relatively small motor 32, such as an electric motor mounted in any suitable convenient locations, such as directly on the handle 12, on the frame 14, or the like, as desired. The motor 31 is operably connected with a switch means 32 which is preferably secured to the frame means 14 or otherwise conveniently mounted on the reel 10 and encased by one end cap, such as the end cap or housing 28. A suitable battery pack 34 is operably connected between the switch means 32 and the motor 31 by electrical leads 33 and 35 in any well known manner (not shown) whereby activation of the switch means 32 causes actuation of the motor 31 in a manner and for a purpose as will be hereinafter set forth. The battery pack 34 is preferably a remote assembly which may be carried in a pocket or otherwise supported spaced from but within reasonable operational distance with respect to the reel 10. The battery pack 34 may be of any well known type, but preferably includes a pair of flashlight batteries, or the like, for energization of the motor 31 as is well know.

A lever means 36 is pivotally secured at 38 to the frame means 14 and is interposed between the motor 31 and the switch means 32. A suitable drive gear member 40 is journalled on the outer face of the lever 36 for selective meshing engagement with a suitable driven gear member 42 which may be keyed or otherwise secured to the shaft 24 for rotation simultaneously therebetween, as will be hereinafter set forth. The drive gear 40 may be spaced from the outer face of the lever means 36 by a concentrically arranged pully member 44, as particularly shown in FIG. 3. The pulley 44 and gear 40 are intimately arranged for simultaneous rotation therebetween about a common axis. A complementary pulley member 46 is secured to the drive shaft 48 of the motor 32, and a suitable endless belt means 48 extends around and between the pulleys 44 whereby rotation is transmitted to the pulley 44 upon rotation of the drive shaft 48. Of course, rotation of the pulley 44 transmits rotation to the drive gear 40 by virtue of the connection therebetween.

The lever means 36 is preferably of a substantially flat planar configuration and is provided with a substantially straight arm 50 having an angular arm 52 extending outwardly therefrom providing a substantially U-shaped recess 54 as particularly shown in FIGS. 1 and 2 for selective engagement with a hub member 55 disposed concentrically with respect to the gear 42. The pivot connection 38 is connected with the arm 52 by any suitable lost motion connection means (not shown) such as a pin and slot arrangement and is spaced inboard of the outer end of the arm 52 and a post or stop means 56 extends outwardly from the frame means 14 for limiting the movement of the arm 52 in one direction. The tension in the belt means 48 constantly urges the lever means 36 in a clockwise direction about the pivot point 38, as viewed in FIGS. 1 and 2, and the engagement of the outer end of the angular arm 52 with the stop means 56 limits the pivotal movement of the lever means 36 in this clockwise direction. In order to energize motor 31, the lever means 36 and particularly the arm member 50 thereof may be manually engaged for movement of the lever means 36 in a counterclockwise direction against the force of the belt 48. As the lever means 36 is moved in the counterclockwise direction, the drive gear 40 is moved into a meshing engagement with the driven gear 42, subsequent to which the outer end of the arm member 50 engages the switch means 32 for activation thereof.

In the event the gears 40 and 42 do not move into a meshing engagement upon the initial movement of the lever means 36, but are in interfering relative positions, the lost motion connection of the pivot point 38 with the lever arm 52 permits the gears to roll with respect to each other, or otherwise "fall" into a true meshing engagement, with the respective gear teeth in proper relationship. In addition, the U-shaped recess 54 "rides" around the outer periphery of the hub member 55, and comes into a full engagement with the hub member as shown in FIG. 2, whereupon the counterclockwise movement of the lever means 36 may be continued without risking damage to the mating gear teeth of the gears 40 and 42.

The activation of the switch means 32 actuates the motor 31 whereby the drive shaft rotates the pulley 46 to transmit rotation to the driven gear 42 through the belt 48, pulley 44 and drive gear 40. Of course, as soon as the manual force is released or removed from the lever means 36, the belt 48 returns the lever means 36 to its normal position wherein the arm 52 is engaged with the stop 56 and the gears 40 and 42 are disengaged from one another. In this disengaged position, the reel 10 may be used in the normal manner such as for free wheeling of the spool means during casting of the line 18 from the reel, and a manual rewinding of the line 18 onto the spool by the manual handle means 26 if desired.

In use, the line 18 may be cast from the reel in the usual manner, that is the fishing rod 13 and handle 12 may be manually manipulated as is well known for casting the fish hook and bait into the body of water at a site remote from the fishing rod, thus freely unwinding the line 18 from the spool means 16. In the event it is desirable to retrieve the fish hook and bait in order to recast same, the line 18 may be rewound onto the spool means 16 by manual operation of the handle means 26. However, as many casting and rewinding operations are repeated, the fisherman may become somewhat weary, and the rewinding of the line becomes tiresome and time consuming. The time required for the manual rewinding of the line is a particular disadvantage in tournament fishing. In order to reduce the energy and time required for the rewinding of the line 18 onto the spool means 16, the lever means 36 may be manually pivoted in a counterclockwise direction about the pivot 38, as shown in FIGS. 1 and 2, for initially engaging the drive gear 40 with the driven gear 42 and subsequently engaging the switch means 33 for initiating the operation of the motor 31. As long as the lever means 36 remains in engagement with the switch means 32, the spool means will be rotated in the rewind direction for winding the line 18 onto the spool means. When the line 18 has been sufficiently rewound, the lever means 36 may be released, and the casting action of the line may be repeated, as desired.

Figure 4:
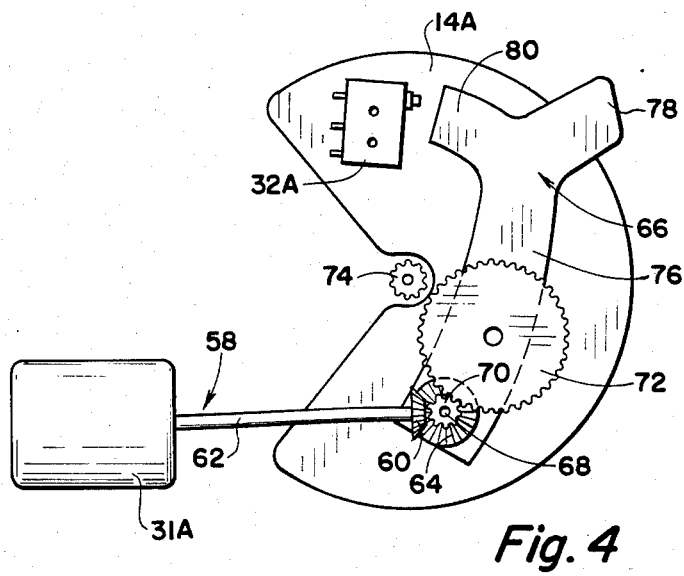
FIG. 4 is an elevational view of the power supply and spool drive means of a modified fishing reel embodying the invention, and illustrates the spool drive means in a disengaged position.
Figure 5:
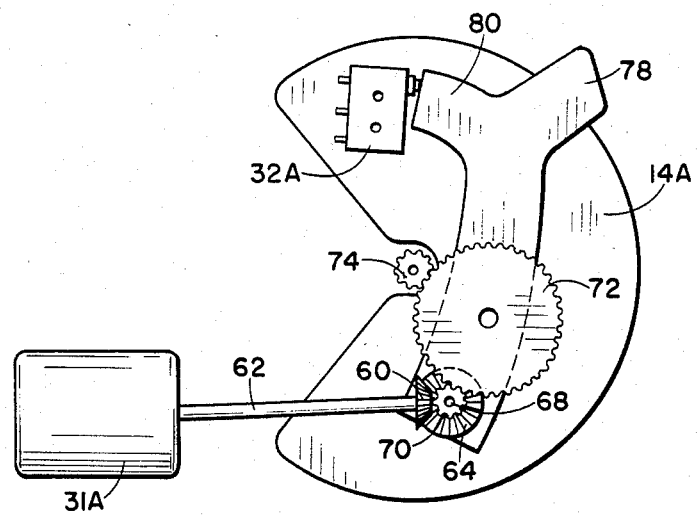
FIG. 5 is a view similar to FIG. 4, illustrating the spool drive means in an engaged position for transmitting rotation to the spool means.

Referring now to FIGS. 4 and 5, a modified drive means 58 for the spool means 16 is shown which comprises a motor 31A generally similar to the motor 31 and a switch means 32A mounted on a frame means 14A and operably connected with the motor 31A substantially the same as in the aforementioned embodiment. A suitable bevel gear 60 is secured to the outer end of the drive shaft 62 of the motor 31A and is in constant meshing engagement with a complementary bevel gear member 64 which is carried by a lever member 66 pivotally secured at 68 to the frame means 14A. A suitable drive gear 70 is secured to the bevel gear 68 and in axial alignment therewith. The gear 70 is in constant meshing engagement with an intermediate gear 72 journalled on the lever 66. The gear 72 is adapted for selective engagement with a gear 74 which is operably connected with the spool means 16 in any well known manner for facilitating the winding of the line 18 onto the spool means 16.

The lever means 66 is preferably of a substantially flat configuration and includes a main leg member 76 having one end pivotally connected with the frame means 14A at 68, and a pair of outwardly diverging arm members 78 and 80 provided at the opposite end thereof. One of the arms, such as the arm 78, may protrude from the reel 10 for manual engagement as will be hereinafter set forth, and the other arm 80 is adapted to selectively engage the switch means 32A for activation of the motor 31A in the manner as hereinbefore set forth in connection with the switch means 32 and motor 31. If desired, suitable spring means, or the like (not shown) may be connected between the frame means 14A and lever means 66 for constantly urging the lever 66 in a clockwise direction about the pivot connection 68, as viewed in FIGS. 4 and 5. In addition, any suitable stop means (not shown) may be provided for limiting the movement of the lever in the clockwise direction.

In operation, the arm 78 may be manually engaged for pivoting the lever means 66 in a counterclockwise direction about the connection 68 when it is desired to activate the motor 31A for winding the line 18 onto the spool means 16. As the lever means 66 is moved in the counterclockwise direction, the gear 72 is initially brought into meshing engagement with the gear 74, and subsequently the outer end of the arm 80 engages the switch means 32A for energization of the motor 31A. As the drive shaft 62 is rotated by the energized motor 31A, the spool means 16 is rotated or activated in the direction for winding the line 18 thereon, and as long as the arm member 80 is engaged with the switch means 32A, the motor 31A will be energized. When it is desirable to cease the line winding operation, the arm member 78 may be released from manual engagement, whereupon the spring means, or the like (not shown) will return the lever means 66 to the normal position thereof, the normal position being a disengaged position between the gears 72 and 74 as shown in FIG. 4.

From the foregoing it will be apparent that the present invention provides a novel portable hand held type fishing reel adapted for ready installation on the handle means of substantially any desired fishing reel. Spool drive means is provided for the fishing reel whereby a manually actuated pivotal lever means is movable between alternate engaged and disengaged positions with the motor activating switch means in order to facilitate the winding of the fishing line onto the spool means. The lever means is particularly designed whereby the gear train driving the spool means in one direction is engaged prior to energization of the motor, thus substantially precluding accidental damage to the gear members.

Whereas the present invention has been described in particular relation to the drawings attached hereto, it should be noted that other and further modifications, apart from those shown or suggested herein may be made within the spirit and scope of this invention.

What is claimed is:

1. A fishing reel comprising spool means having a line wound thereon, drive means operably connected with the spool means for selective actuation thereof to facilitate winding of the line thereon, said drive means comprising power means secured in the proximity of the spool means, gear train means interposed between the power means and the spool means and having alternate engaged and disengaged positions for providing the selective activation of the spool means in one direction upon energization of the power means, switch means operably connected with the power means for energization thereof, lever means interposed between the power means and switch means and operably connected with the gear means, the lever means being selectively movable for providing the engaged and disengaged positions of the gear train means and intermittent actuation of the switch means for intermittent energization of the power means, and wherein the lever means carries at least one gear of the gear train means and includes means for engaging the switch means whereby the one gear is brought into operative engagement with the gear train prior to engagement of the switch means.

2. A fishing reel as set forth in claim 1 wherein the gear train means includes a drive gear means mounted on the lever means, a driven gear means operably connected with the spool means for actuation thereon in one direction for winding the line onto the spool means, and belt and pulley means operably connected between the power means and the drive gear means for rotation of the drive gear means upon energization of the power means.

3. A fishing reel as set forth in claim 1 wherein the gear train means includes a first gear member operably connected with the spool means for actuation thereof in one direction for winding the line onto the spool means, a second gear member journalled on the lever means and intermittently engageable with the first gear member for transmitting rotation thereto upon energization of the power means, a third gear journalled on the lever means in meshing engagement with the second gear member, a fourth gear journalled on the lever means in substantial axial alignment with the third gear member and rotatable simultaneously therewith, and a fifth gear member operably engaged with the fourth gear member and operably connected with the power means for rotation upon energization thereof.

4. A fishing reel as set forth in claim 1 wherein the power means comprises an electric motor connected with the switch means by battery means.

5. A fishing reel as set forth in claim 5 wherein the battery means is remotely disposed with respect to the fishing reel.

6. A fishing reel comprising spool means having a line wound thereon, drive means operably connected with the spool means for selective actuation thereof to facilitate winding of the line thereon, said drive means comprising power means secured in the proximity of the spool means, gear train means interposed between the power means and the spool means and having alternate engaged and disengaged positions for providing the selective activation of the spool means in one direction upon energization of the power means, switch means operably connected with the power means for energization thereof, lever means interposed between the power means and switch means and operably connected with the gear means, the lever means being selectively movable for providing the engaged and disengaged positions of the gear train means and intermittent actuation of the switch means for intermittent energization of the power means, the power means comprising an electric motor connected with the switch means by battery means, and wherein the lever means carries at least one gear member of the gear train and is pivotal to provide alternate disengaged and engaged positions of the said one gear with the gear train, the engaged position of the gear with the gear train being achieved prior to activation of the switch means for energization of the motor.

* * * * *